US011266284B2

(12) United States Patent
Eo et al.

(10) Patent No.: US 11,266,284 B2
(45) Date of Patent: Mar. 8, 2022

(54) CLEANER

(71) Applicant: LG ELECTRONICS INC., Seoul (KR)

(72) Inventors: Soohan Eo, Seoul (KR); Moohyun Ko, Seoul (KR); Jinhyouk Shin, Seoul (KR); Sungjun Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 16/893,238

(22) Filed: Jun. 4, 2020

(65) Prior Publication Data

US 2020/0383545 A1 Dec. 10, 2020

(30) Foreign Application Priority Data

Jun. 5, 2019 (KR) ........................ 10-2019-0066898
Jul. 1, 2019 (KR) ........................ 10-2019-0078915

(51) Int. Cl.

| | |
|---|---|
| ***B01D 50/00*** | (2006.01) |
| ***A47L 9/16*** | (2006.01) |
| ***B04C 5/28*** | (2006.01) |
| ***B04C 9/00*** | (2006.01) |
| ***B04C 5/185*** | (2006.01) |
| ***A47L 9/12*** | (2006.01) |
| ***A47L 9/10*** | (2006.01) |

(52) U.S. Cl.

CPC ............. *A47L 9/1608* (2013.01); *A47L 9/108* (2013.01); *A47L 9/127* (2013.01); *A47L 9/165* (2013.01); *A47L 9/1641* (2013.01); *A47L 9/1683* (2013.01); *B04C 5/185* (2013.01); *B04C 5/28* (2013.01); *B04C 9/00* (2013.01); *B04C 2009/002* (2013.01)

(58) Field of Classification Search

CPC ........ A47L 9/1608; A47L 9/127; A47L 9/165; A47L 9/1641; A47L 9/108; A47L 9/1683; A47L 9/1625; A47L 9/322; A47L 5/24; B04C 5/28; B04C 9/00; B04C 5/185; B04C 2009/002; B01D 45/12

See application file for complete search history.

(56) References Cited

U.S. PATENT DOCUMENTS

2001/0025395 A1* 10/2001 Matsumoto ............... A47L 9/20 15/353
2003/0159235 A1* 8/2003 Oh ........................ A47L 9/1666 15/352

(Continued)

FOREIGN PATENT DOCUMENTS

KR 10-2018-0023274 A 3/2018
KR 10-1952694 B1 2/2019

*Primary Examiner* — Dung H Bui

(74) *Attorney, Agent, or Firm* — Dentons US LLP

(57) ABSTRACT

A cleaner includes a housing including a suction opening, a cyclone part configured to separate air and dust, and a dust bin configured to store dust separated from air in the cyclone part and a frame disposed to surround an axis of a cyclone flow of the cyclone part in the housing and configured to be movable between a first position and a second position in the housing, wherein the frame includes a first body disposed to face the suction opening at the first position and disposed to be inclined with respect to the axis of the cyclone flow, and an upper end of the first body is located to be the same as or higher than an upper end of the suction opening.

20 Claims, 12 Drawing Sheets

(56) References Cited

U.S. PATENT DOCUMENTS

| | | | | |
|---|---|---|---|---|
| 2003/0159236 | A1* | 8/2003 | Oh | A47L 9/20 15/352 |
| 2003/0159237 | A1* | 8/2003 | Oh | A47L 9/20 15/352 |
| 2003/0208879 | A1* | 11/2003 | Oh | A47L 9/1666 15/352 |
| 2004/0025285 | A1* | 2/2004 | McCormick | A47L 9/1683 15/352 |
| 2004/0163206 | A1* | 8/2004 | Oh | A47L 9/20 15/353 |
| 2004/0187253 | A1* | 9/2004 | Jin | A47L 9/20 15/352 |
| 2005/0132528 | A1* | 6/2005 | Yau | A47L 5/24 15/344 |
| 2005/0198766 | A1* | 9/2005 | Nam | B01D 46/0075 15/352 |
| 2006/0042202 | A1* | 3/2006 | Lee | A47L 9/20 55/289 |
| 2008/0264014 | A1* | 10/2008 | Oh | A47L 9/108 55/423 |
| 2008/0264015 | A1* | 10/2008 | Oh | A47L 9/108 55/429 |
| 2008/0264016 | A1* | 10/2008 | Oh | A47L 5/28 55/429 |
| 2008/0295466 | A1* | 12/2008 | Cha | A47L 9/1666 55/296 |
| 2011/0000047 | A1* | 1/2011 | Ji | A47L 9/108 15/347 |
| 2012/0073078 | A1 | 3/2012 | Quance et al. | |
| 2014/0366311 | A1* | 12/2014 | Han | A47L 9/16 15/339 |
| 2016/0206167 | A1* | 7/2016 | Kim | B01D 45/16 |
| 2016/0287042 | A1* | 10/2016 | Han | A47L 9/1683 |
| 2017/0234702 | A1 | 8/2017 | Tima et al. | |
| 2018/0055318 | A1* | 3/2018 | Gottschall | A47L 9/102 |
| 2018/0055323 | A1 | 3/2018 | Hwang et al. | |
| 2018/0132685 | A1 | 5/2018 | Muir et al. | |
| 2018/0333034 | A1 | 11/2018 | Zhong et al. | |

* cited by examiner

CLEANER

CROSS-REFERENCE TO RELATED APPLICATIONS

This application claims the benefit of the Korean Patent Application No. 10-2019-0066898 filed on Jun. 5, 2019 and the Korean Patent Application No. 10-2019-0078915 filed on Jul. 1, 2019, which is hereby incorporated by reference as if fully set forth herein.

BACKGROUND

Field

The present disclosure relates to a cleaner.

Related Art

A cleaner is a device that performs cleaning by suctioning or wiping dust or foreign substances in a cleaning target area.

Such a cleaner may be classified as a manual cleaner that performs cleaning, while a user directly moves the cleaner, and an automatic cleaner that performs cleaning, while driving on its own.

In addition, the manual cleaner may be classified as a canister type cleaner, an upright type cleaner, a handy type cleaner, a stick type cleaner, and the like, depending on the type of the cleaner.

Related art document: US Patent Laid-Open Publication No. US2018/0132685A1

The related art document discloses a compression mechanism including a dust compression part compressing dust in a dust bin.

The compression mechanism may include a dust bin having an opening, a filter purifying air in the dust bin, a shroud surrounding the filter, a dust compression part disposed to surround the shroud, a handle operated by a user to move the dust compression part, and a link connected to the handle.

When the dust compression part is lowered by an operation force of the handle transferred thereto through the link, the dust compression part compresses dust in the dust bin.

However, according to the related art document, at least a portion of the dust compression part is located higher than the opening at a standby position, and thus the dust compression part is accommodated in the dust bin without guiding a flow of air.

Therefore, an internal space of the dust bin is reduced by a thickness of the dust compression part, resulting in a reduction in the space for separating dust.

In addition, a lower surface of the dust compression part compresses the dust stored in the dust bin, and here, if the dust compression part is located higher than the opening, a vertical length for the dust compression part to move for compressing the dust within a limited vertical length range is reduced to reduce dust compression performance.

In addition, since the dust compression part moves in contact with an inner circumferential surface of the dust bin, the inner circumferential surface of the dust bin may be cleaned, but there is a possibility that dust may be caught between the dust compression part and the inner circumferential surface of the dust bin, and in this case, a vertical movement of the dust compression part is not smooth.

SUMMARY

The present disclosure provides a cleaner capable of guiding air and dust introduced through a suction opening of a movable part.

The present disclosure provides a cleaner in which dust is prevented from flowing into a gap between an air guide in contact with a movable part and the movable part in the process in which the movable part guides introduced air and dust.

The present disclosure provides a cleaner in which a gap between a frame and a cleaning part is prevented from being opened at a suction opening side.

To achieve these and other advantages and in accordance with the purpose of the disclosure, as embodied and broadly described herein, there is provided a cleaner including: a housing including a suction opening, a cyclone part configured to separate air and dust, and a dust bin configured to store dust separated from air in the cyclone part; and a frame disposed to surround an axis of a cyclone flow of the cyclone part in the housing and configured to be movable between a first position and a second position in the housing.

The frame may be disposed to face the suction opening at the first position, and an upper end of the first body is located to be the same as or higher than an upper end of the suction opening so that the frame is limited from moving downward by air suctioned through the suction opening.

The cleaner may further include a guide wall disposed to surround the axis of the cyclone flow of the cyclone part in the housing and configured to guide a flow of air. The frame may surround the guide wall at the first position.

The first body may be in contact with the guide wall at the first position, and a boundary portion between the upper end of the first body and the guide wall may be located higher than the upper end of the suction opening.

The first body may be disposed to be inclined with respect to the axis of the cyclone flow.

The first body may be located spaced apart from the suction opening, and at least a portion of the first body may be inclined in a direction away from the suction opening from an upper side toward a lower side.

The cleaner may further include a filter part configured to purify air separated from dust at the cyclone part and disposed to surround the axis of the cyclone flow and a cleaning part connected to a lower portion of the frame. At least a portion of the cleaning part may be aligned with the suction opening.

The cleaner may further include a lower extending portion extending downward from the first body, the cleaning part may include a depressed portion in which the lower extending portion is accommodated, and the lower extending portion may be aligned with the suction opening.

An inclination angle of the lower extending portion with respect to a horizontal surface may be greater than an inclination angle of the first body, so that air in contact with the first body may smoothly flow downward by the lower extending portion.

A height of a portion of the cleaning part located below the lower extending portion may be lower than a height of other portions of the cleaning part.

The filter part may include a mesh portion allowing air to pass therethrough, and an upper end of the mesh portion may be located lower than a lower end of the suction opening.

The cleaning part may include a contact end which may be brought into contact with the mesh portion in the process of moving from the first position to the second position, and the contact end may be located higher than the upper end of the mesh portion at the first position. The contact end may be located higher than the lower end of the suction opening. The contact end may be located closer to the lower end of the suction opening than the upper end of the suction opening.

The frame may further include a frame guide extending downward from an outer circumferential surface of the first body and aligned with the suction opening.

The frame guide may include a guide surface, and an extending line of the guide surface may be parallel to an extending line extending in a tangential direction of the cyclone part.

The cleaning part may include a contact end which may be brought into contact with the filter part in the process of moving from the first position to the second position, and a lower end of the frame guide may be located lower than the contact end.

The contact end may be located higher than a lower end of the suction opening, and a lower end of the frame guide may be located at the same height or lower than the lower end of the suction opening.

In another aspect of the present disclosure, there is provided a cleaner including: a housing having a suction opening; a filter part configured to filter dust from air suctioned through the suction opening and spaced apart from an inner circumferential surface of the housing; an air guide configured to guide the air passing through the filter part to a suction motor for generating suction power; and a movable part configured to be movable between a first position and a second position in a space between outside the filter part and the inner circumferential surface of the housing in the housing.

The movable part may include a frame disposed to surround at least a portion of the air guide at the first position and a cleaning part coupled to the frame and brought into contact with the filter part in the process of moving from the first position to the second position.

The frame may include a frame body having a first body aligned with the suction opening and surrounding the air guide.

An upper end of the first body may be located to be the same as or higher than an upper end of the suction opening. An upper end of the air guide may be located higher than the upper end of the first body. At least a portion of the first body may be inclined in a direction away from the suction opening from an upper side to a lower side.

The cleaning part may be located below the frame body, and at least a portion of the cleaning part may be aligned with the suction opening.

In another aspect of the present disclosure, there is provided a cleaner including: a housing including a suction opening, a cyclone part configured to separate air and dust, and a dust bin configured to store dust separated from the air at the cyclone part; and a frame disposed to surround an axis of a cyclone flow of the cyclone part in the housing, configured to be movable between a first position and a second position in the housing, and disposed such that at least a portion thereof faces the suction opening at the first position.

The frame may include a first body configured to guide air suctioned through the suction opening downward at the first position, a lower extending portion extending downward from a lower side of the first body, and a frame guide extending from the first body in a horizontal direction and configured to guide a horizontal flow of air suctioned through the suction opening.

The frame guide may also extend in a downward direction from the first body, and a lower end of the frame guide may be located lower than a lower end of the lower extending portion.

The first body may be inclined in a direction away from the suction opening from an upper side to a lower side.

The upper end of the first body may be located to be the same as or higher than an upper end of the suction opening.

In another aspect of the present disclosure, there is provided a cleaner including: a housing including a suction opening, a cyclone part configured to separate air and dust, and a dust bin configured to store dust separated from the air at the cyclone part; and a frame disposed to surround an axis of a cyclone flow of the cyclone part in the housing, configured to be movable between a first position and a second position in the housing, and disposed such that at least a portion thereof faces the suction opening at the first position, wherein the frame may include a first body in which at least a portion thereof is inclined in a direction away from the suction opening from an upper side to a lower side so as to guide air suctioned through the suction opening downward at the first position. An upper end of the first body may be located to be the same as or higher than an upper end of the suction opening.

DETAILED DESCRIPTION OF THE DISCLOSURE

Figure 1:
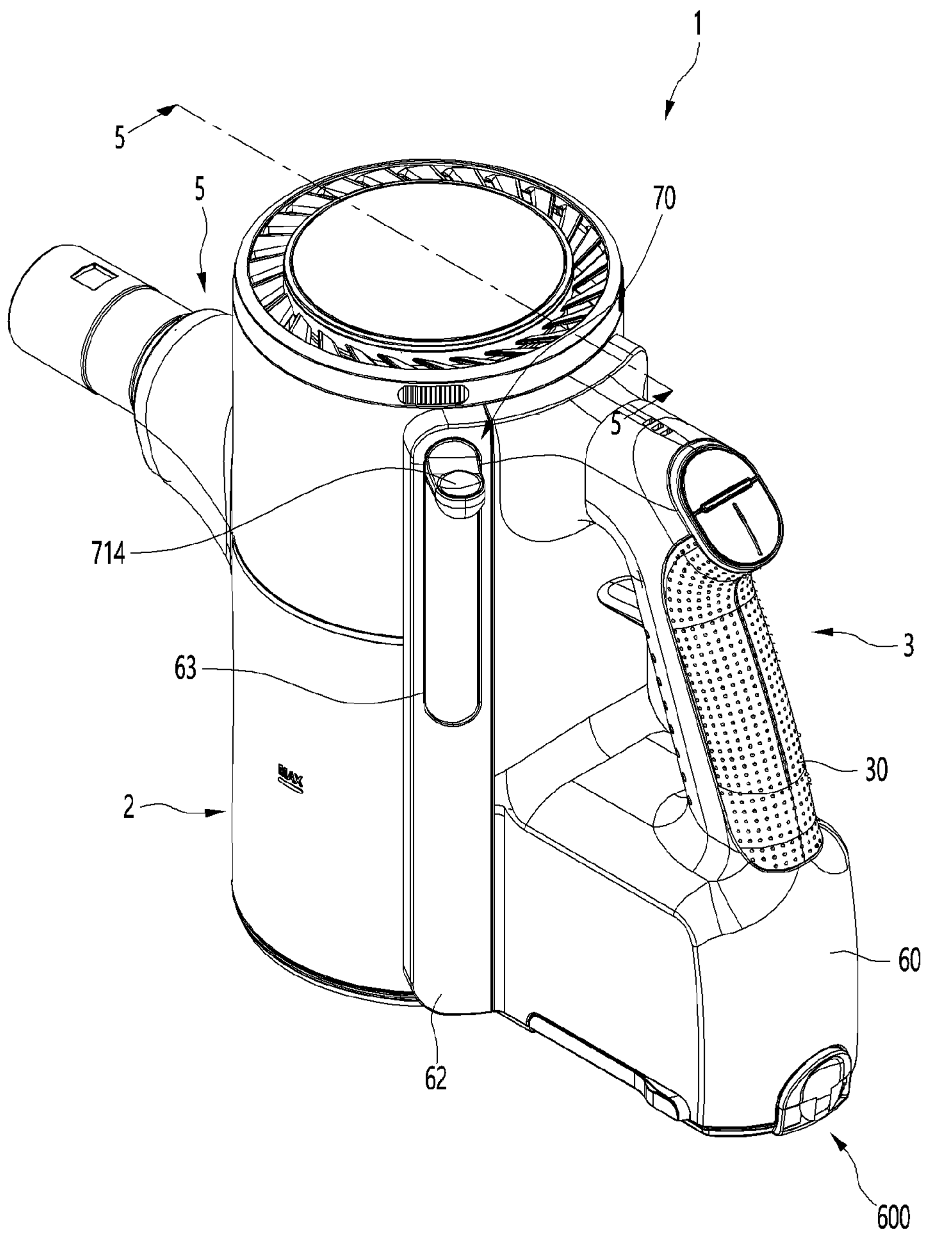
FIG. 1 is a perspective view of a cleaner according to an embodiment of the present disclosure.

Hereinafter, some embodiments of the present disclosure will be described in detail with reference to the accompanying drawings. It should be noted that when components in the drawings are designated by reference numerals, the same components have the same reference numerals as far as possible even though the components are illustrated in different drawings. Further, in description of embodiments of the present disclosure, when it is determined that detailed descriptions of well-known configurations or functions disturb understanding of the embodiments of the present disclosure, the detailed descriptions will be omitted.

Also, in the description of the embodiments of the present disclosure, the terms such as first, second, A, B, (a) and (b) may be used. Each of the terms is merely used to distinguish the corresponding component from other components, and does not delimit an essence, an order or a sequence of the corresponding component. It should be understood that when one component is “connected”, “coupled” or “joined” to another component, the former may be directly connected or jointed to the latter or may be “connected”, “coupled” or “joined” to the latter with a third component interposed therebetween.

Figure 2:
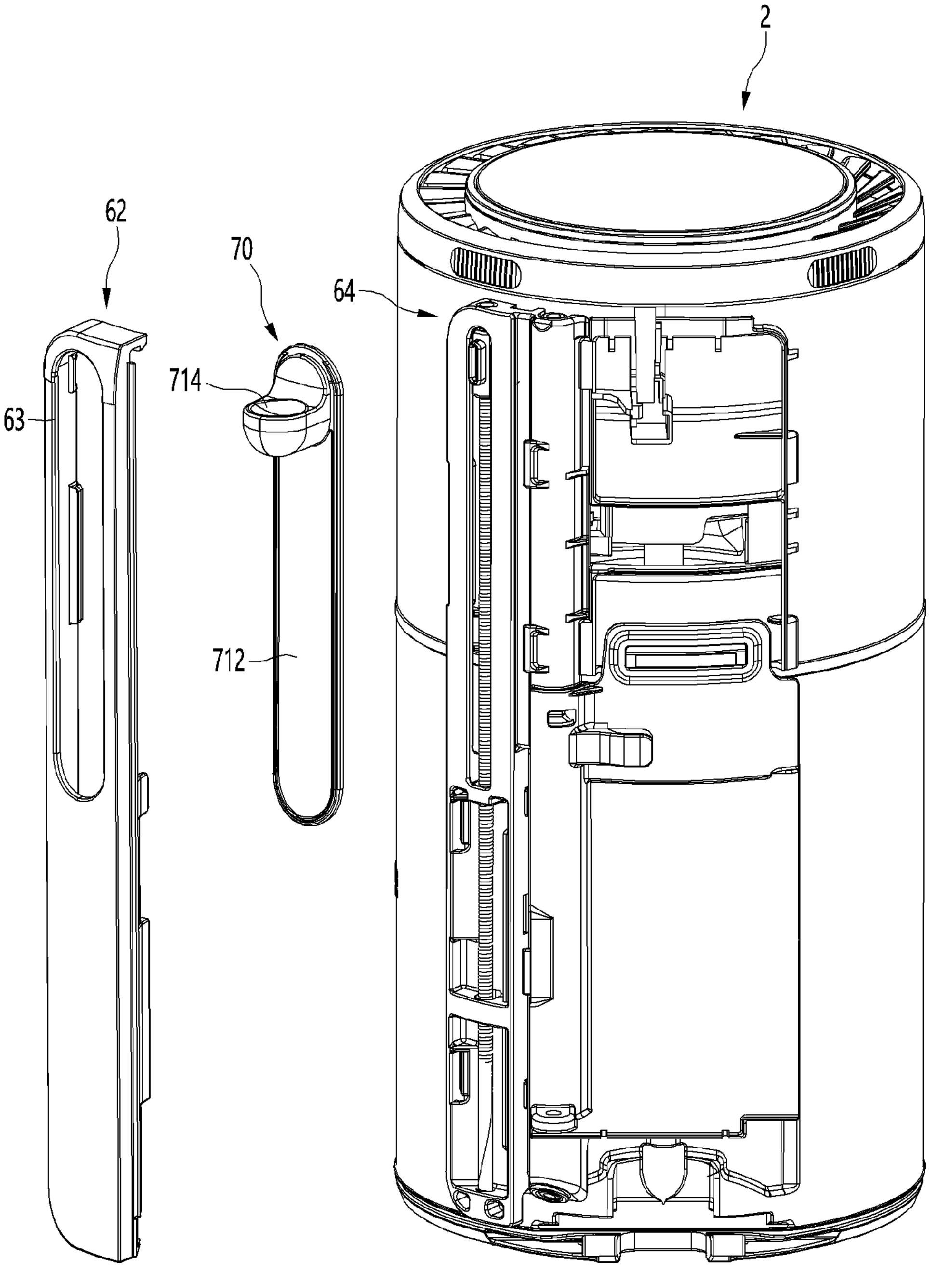
FIG. 2 is a perspective view showing a state in which a handle part is separated from a cleaner according to an embodiment of the present disclosure.
Figure 3:
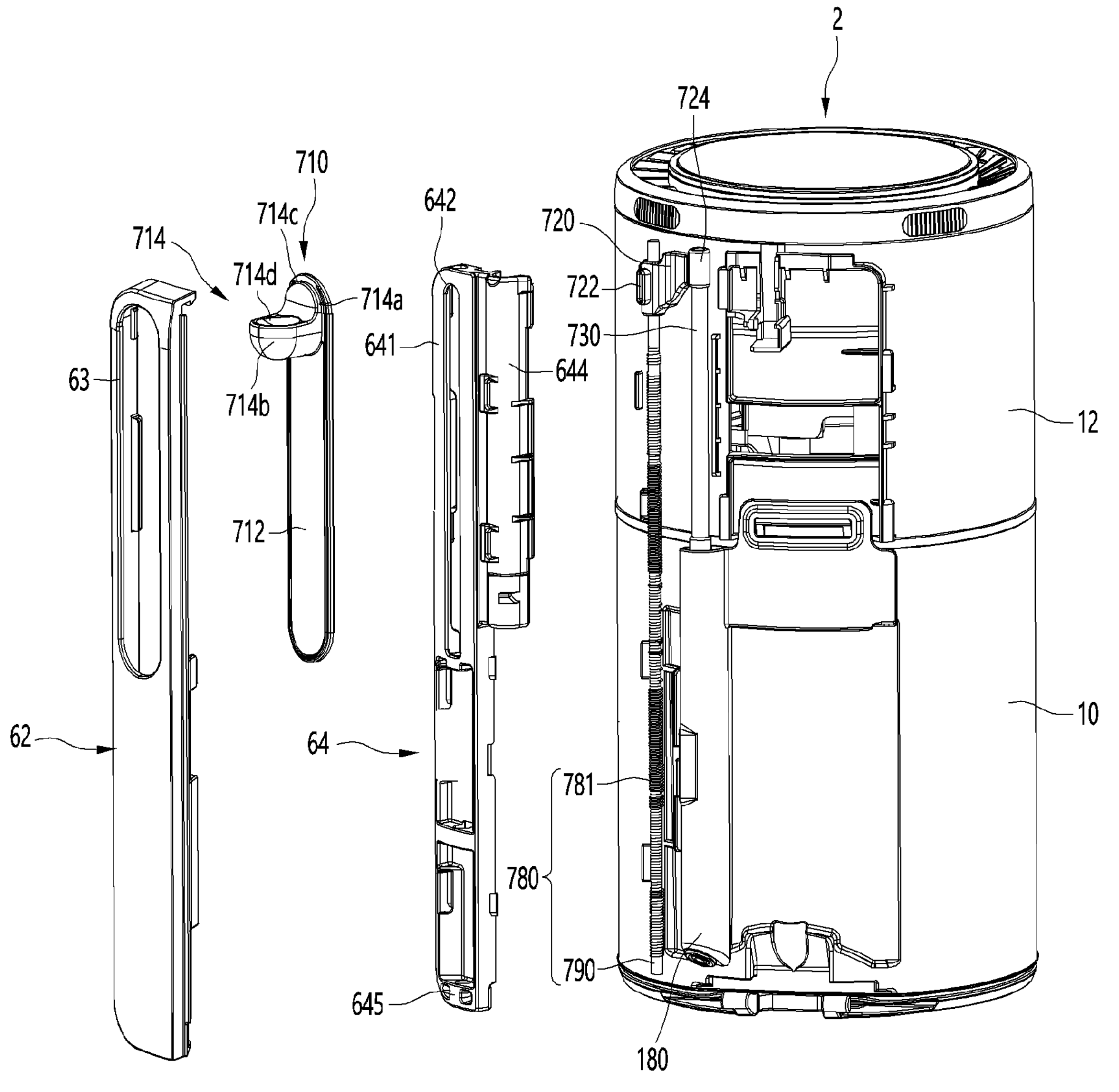
FIG. 3 is a view showing a state in which a guide frame is separated from FIG. 2.
Figure 4:
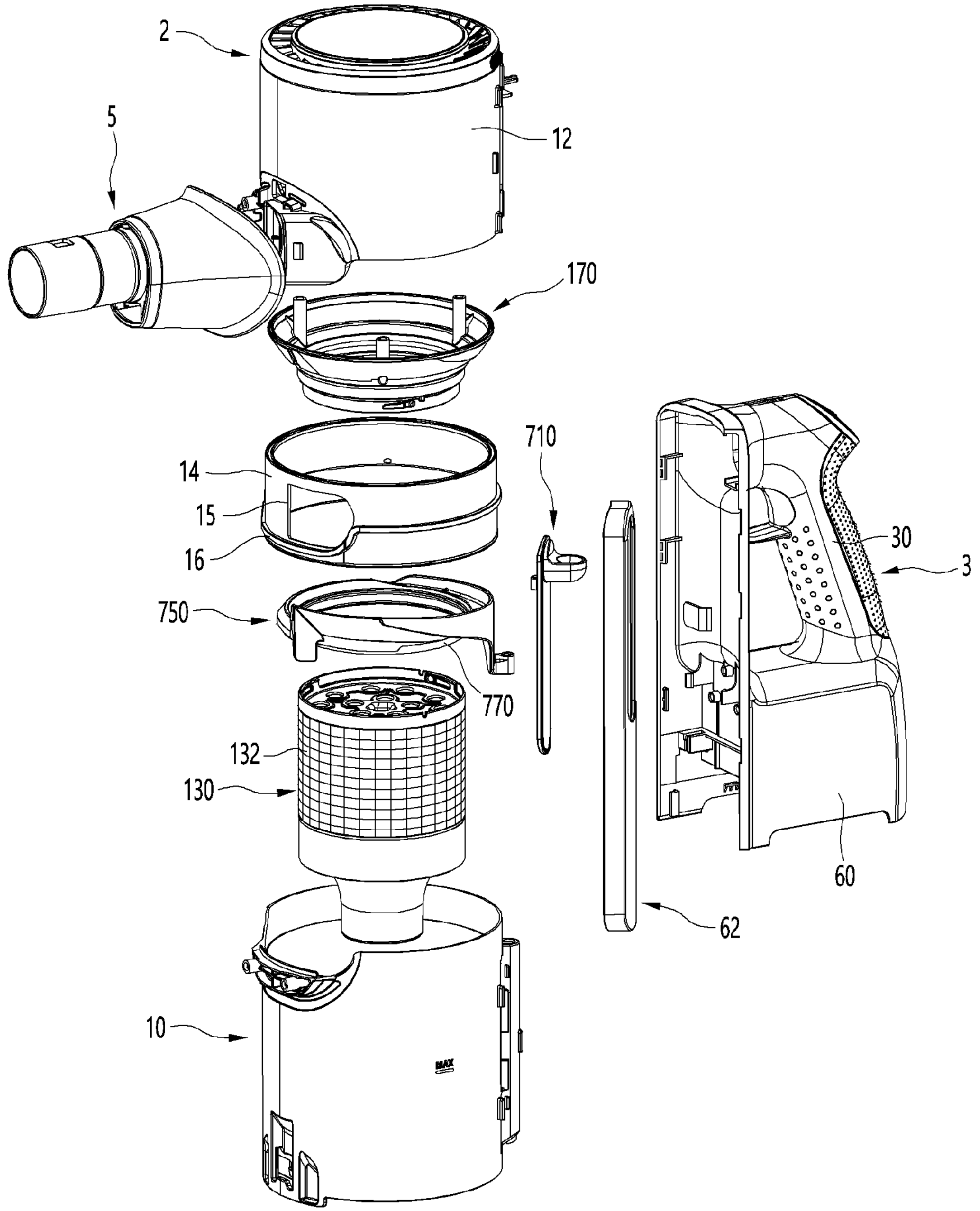
FIG. 4 is an exploded perspective view of a cleaner according to an embodiment of the present disclosure.
Figure 5:
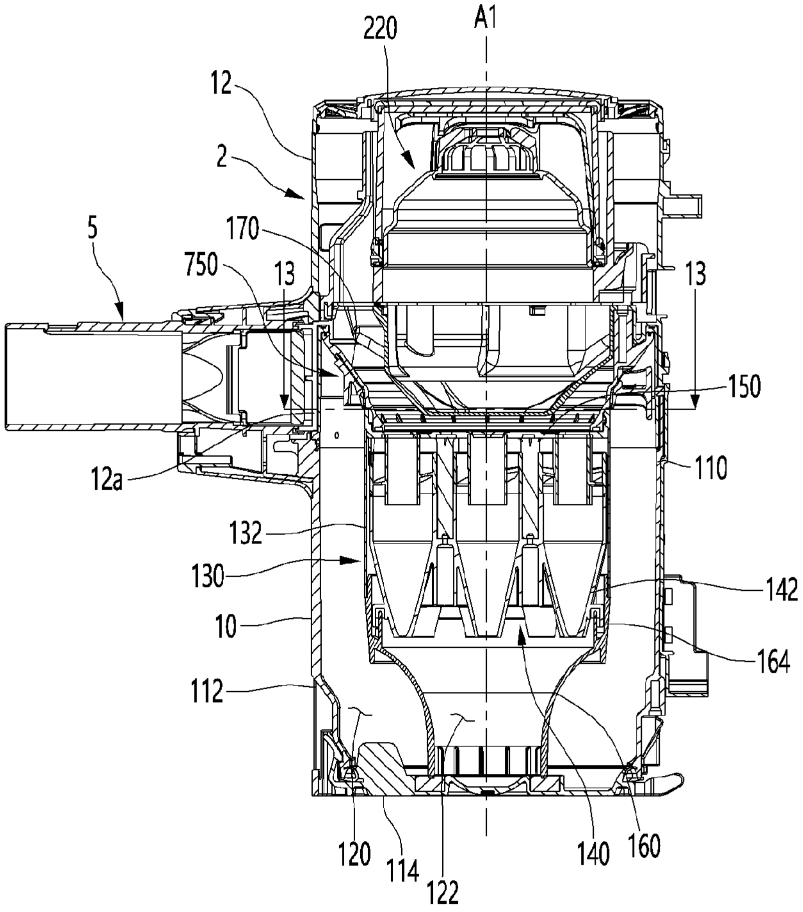
FIG. 5 is a cross-sectional view taken along line 5-5 of FIG. 1.

FIG. 1 is a perspective view of a cleaner according to an embodiment of the present disclosure, FIG. 2 is a perspective view showing a state in which a handle part is separated from a cleaner according to an embodiment of the present disclosure, and FIG. 3 is a view showing a state in which guide frame is separated from FIG. 2, FIG. 4 is an exploded perspective view of a cleaner according to an embodiment of the present disclosure, and FIG. 5 is a cross-sectional view taken along line 5-5 of FIG. 1.

Referring to FIGS. 1 to 5, the cleaner 1 according to an embodiment of the present disclosure may include a main body 2. The cleaner 1 may further include a suction part 5 (or suction inlet) through which air containing dust is suctioned. The suction part 5 may guide the air containing dust to the main body 2.

The cleaner 1 may further include a handle part 3 coupled to the main body 2. The handle part 3 may be located on the opposite side of the suction part 5 with respect to the main body 2, for example. However, the positions of the suction part 5 and the handle part 3 are not limited thereto.

The main body 2 may separate the dust suctioned through the suction part 5 and store the separated dust.

In one example, the main body 2 may include a dust separator. The dust separator may include a first cyclone part 110 capable of separating dust by a cyclone flow. The first cyclone part 110 may communicate with the suction part 5.

The air and dust suctioned through the suction part 5 spirally flows along an inner circumferential surface of the first cyclone part 110.

The dust separator may further include a second cyclone part 140 for separating dust from the air discharged from the first cyclone part 110 again.

The second cyclone part 140 may include a plurality of cyclone bodies 142 arranged in parallel. The air discharged from the first cyclone part 110 may be divided into the plurality of cyclone bodies 142 and pass therethrough.

As another example, it is also possible that the dust separator has a single cyclone part.

The main body 2 may be formed in a cylindrical shape, for example. An outer shape of main body 2 may be formed by a plurality of housings.

In one example, the main body 2 may include a first housing 10 having a substantially cylindrical shape and a second housing 12 coupled to an upper side of the first housing 10 and having a substantially cylindrical shape.

An upper portion of the first housing 10 defines the first cyclone part 110, and a lower portion of the first housing 10 may define a dust bin 112 storing dust separated from the first cyclone part 110. The dust bin 112 may include a first dust storage 120 storing dust separated from the first cyclone part 110.

A lower side of the first housing 10 (i.e., a lower side of the dust bin 112) may be opened and closed by a housing cover 114 that rotates by a hinge.

In order to seal a boundary between the first housing 10 and the second housing 12 in a state where the first housing 10 and the second housing 12 are coupled, the cleaner 1 may further include a sealing member 16 and a support body 14 supporting the sealing member 16.

Upper and lower sides of each of the first housing 10 and the second housing 12 are open. That is, each of the housings 10 and 12 may include an upper opening and a lower opening.

The support body 14 may be formed in a cylindrical shape. Here, an outer diameter of the support body 14 may be equal to or smaller than an inner diameter of the first housing 10 so that the support body 14 may be inserted into the first housing 10 through the upper opening of the first housing 10.

The outer diameter of the support body 14 may be equal to or smaller than an inner diameter of the second housing 12 so that the support body 14 may be inserted into the second housing 12 through the lower opening of the second housing 12.

The support body 14 may include a communication opening 15 through which air passes. The communication opening 15 may communicate with the suction part 5.

The sealing member 16 may be coupled to the support body 14 to surround an outer circumferential surface of the support body 14. For example, the sealing member 16 may be integrally formed with the support body 14 by insert injection molding. Alternatively, the sealing member 16 may be coupled to the outer circumferential surface of the support body 14 by an adhesive.

The main body 2 may include a suction opening (See 12*a* of FIG. 12) through which air guided through the suction part 5 flows.

Figure 12:
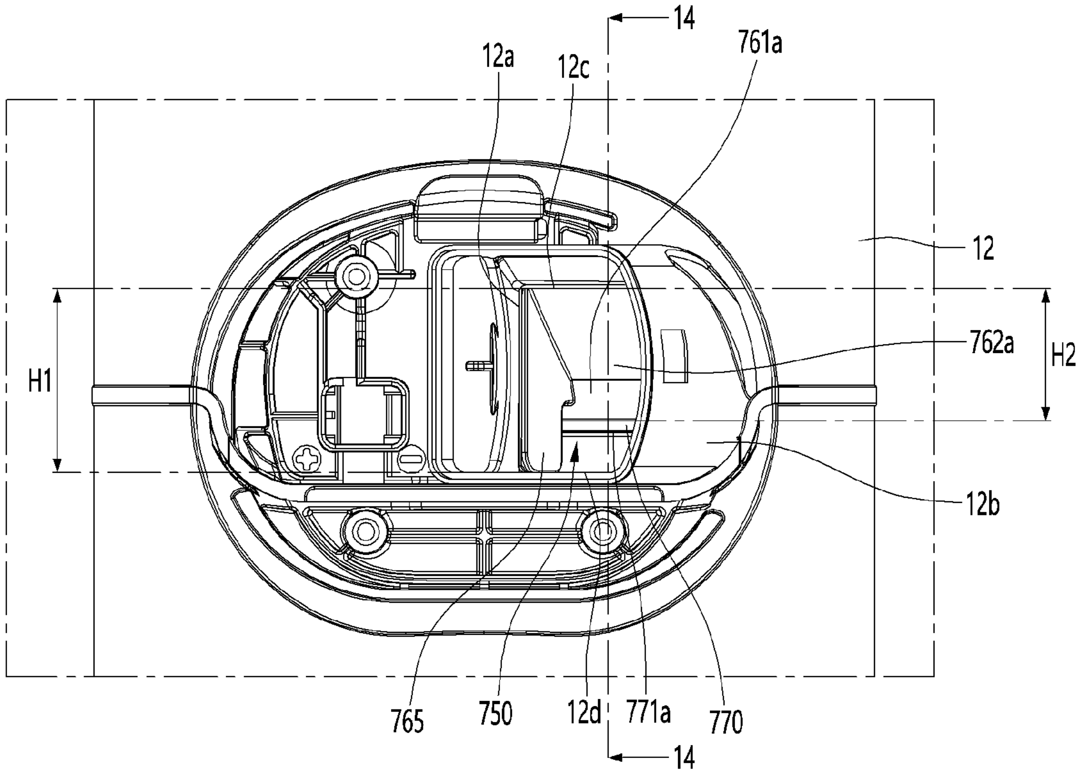
FIG. 12 shows a suction opening viewed from outside of a main body.

One of the first housing 10 and the second housing 12 may include the suction opening (See 12*a* in FIG. 12), or the first housing 10 may form a part of the suction opening (See 12*a* of FIG. 12) and the second housing 12 may form another part of the suction opening (See 12*a* in FIG. 12).

Hereinafter, a case where the second housing 12 includes the suction opening (See 12*a* in FIG. 12) will be described.

When the second housing 12 is coupled to the first housing 10, the suction opening 12*a* of the second housing 12 and the communication opening 15 of the support body 14 are aligned.

The suction opening 12*a* is aligned with the suction part 5. Therefore, dust and air may be introduced into the first cyclone part 110 through the inside of the suction part 5, the suction opening 12*a*, and the communication opening 15.

In this embodiment, the support body 14 may be omitted. In this case, an upper end of the first housing 10 may be in direct contact a lower end of the second housing 12. In addition, dust and air may flow into the first cyclone part 110 through the suction opening 12*a* after passing through the inside of the suction part 5.

In the present disclosure, a configuration for guiding air from the suction part 5 to the first cyclone part 110 may be referred to as a suction passage of the main body 2.

The suction passage may include only the suction opening 12*a* or may include the suction opening 12*a* and the communication opening 15.

The main body 2 may further include a filter part 130 disposed to surround the second cyclone part 140.

The filter part 130 is formed in a cylindrical shape, for example, and guides air separated from dust in the first cyclone part 110 to the second cyclone part 140. The filter part 130 filters dust in the process in which air passes therethrough.

The filter part 130 may be arranged to surround an axis A1 of a cyclone flow of the first cyclone part 110.

To this end, the filter part 130 may include a mesh portion 132 having a plurality of holes. The mesh portion 132 may be formed of a metal but is not limited thereto. Since the mesh portion 132 filters air, dust may accumulate on the mesh portion 132, and thus the mesh portion 132 needs to be cleaned.

In the present disclosure, the cleaner 1 may further include a compression mechanism 70 capable of compressing dust stored in the first dust storage 120.

Since capacity of the first dust storage 120 is limited, the amount of dust stored in the first dust storage 120 may increase during repeated cleaning, and thus a usage time of and the number of times the cleaner is used may be limited.

If the amount of dust stored in the first dust storage 120 increases, the user may cause the housing cover 114 to open the first dust storage 120 to remove dust of the first dust storage 120.

In this embodiment, when dust stored in the first dust storage 120 is compressed using the compression mechanism 70, density of the dust stored in the first dust storage 120 increases, and thus a volume thereof decreases.

Therefore, according to the present embodiment, the number of times for emptying the dust bin 112 is reduced, and accordingly, an available time before emptying the dust bin advantageously increases.

The compression mechanism 70 may also clean the mesh portion 132 during a movement process.

The compression mechanism 70 may include a movable part 750 movable in the main body 2, an operating part 710 (or manipulating part) operated by the user to move the movable part 750, and transfer parts 720 and 730 transferring an operation force of the operating part 710 to the movable part 750.

The operating part 710 may be disposed outside the main body 2. For example, the operating part 710 may be located outside the first housing 10 and the second housing 12.

At least a portion of the operating part 710 may be located higher than the first housing 10. Also, at least a portion of the operating part 710 may be located higher than the movable part 750.

The operating part 710 may include a pressing part 714. The pressing part 714 may be located higher than the first housing 10 and the movable part 750.

The operating part 710 may include an operating part body 712. The operating part body 712 may have a vertical length longer than a horizontal width. The pressing part 714 may protrude from an upper portion of the operating part body 712.

The pressing part 714 may protrude in the horizontal direction from the operating part body 712 in a state where the operating part body 712 is disposed in a vertical direction.

In one example, the pressing part 714 may be located closer to an upper end than a lower end of the operating part body 712. The pressing part 714 may protrude from a position spaced apart downward from the upper end of the operating part body 712.

The pressing part 714 may include a first portion 714*a* protruding from the operating part body 712 and a second portion 714*b* additionally protruding from the first pressing part 714*a*.

The second portion 714*b* may protrude from a position spaced apart by a predetermined distance downward from an upper end 714*c* of the first portion 714*a*.

The user may move the operating part 710 downward by pressing an upper surface 714*d* of the second portion 714*b*. Therefore, an upper surface 714*d* of the second portion 714*b* serves as a pressing surface.

The operating part 710 may further include a coupling protrusion (See 716 of FIG. 6) located on the opposite side of the pressing part 714 in the operating part body 712.

The handle part 3 may include a handle body 30 for the user to grip and a battery housing 60 disposed below the handle body 30 and accommodating a battery 600.

The handle body 30 and the battery housing 60 may be disposed in an up-down direction, and the handle body 30 may be located above the battery housing 60.

The handle part 3 may guide movement of the operating part 710, while covering a portion of the operating part 710.

In one example, the handle part 3 may further include an operating part cover 62. The operating part cover 62 may be located on the side of the handle body 30 and the battery housing 60.

The operating part cover 62 may be formed integrally with the handle body 30 and the battery housing 60 or may be formed separately.

If the operating part cover 62 is formed separately from the handle body 30 and the battery housing 60, the operating part cover 62 may be coupled to the main body 2.

In a state where the user grips the handle body 30 by a right hand, the operating part 710 may be located on the left of the handle body 30. Of course, in a state where the user grips the handle body 30 by a left hand, the operating part 710 may be located on the right of the handle body 30. The user may easily operate the operating part 710 by a hand that does not grip the handle body 30.

The operating part 710 may move in a direction parallel to the axis A1 of the cyclone flow of the first cyclone part 110.

For example, the axis A1 of the cyclone flow of the first cyclone part 110 may extend in the up-down direction in a state where the dust bin 112 is placed on the floor. Therefore, the operating part 710 may also be moved in the up-down direction in a state where the dust bin 112 is placed on the floor.

A slot 63 may be provided on the operating part cover 62 for movement of the operating part 710. The pressing part 714 of the operating part 710 may penetrate the slot 63.

A vertical length of the operating part body 712 may be longer than a length of the slot 63. A horizontal width of the operating part body 712 may be longer than a horizontal width of the slot 63.

The horizontal width of the pressing part 714 may be equal to or smaller than the horizontal width of the slot 63. The vertical length of the pressing part 714 may be smaller than the vertical length of the slot 63.

A protruding length of the pressing part 714 may be larger than a front-rear width of the operating part cover 62. Therefore, the pressing part 714 may penetrate the slot 63 and may protrude outside the operating part cover 62 through the slot 63.

The horizontal width of the operating part body 712 may be smaller than the horizontal width of the operating part cover 62. The vertical length of the operating part body 712 may be smaller than the horizontal width of the operating part cover 62.

A front-rear width of the operating part body 712 may be smaller than a front-rear width of the operating part cover 62. The operating part cover 62 may form a space for the operating part body 712 to locate. The operating part body 712 may move in the up-down direction in a state where the operating part body 712 is located in the operating part cover 62.

In the operating part cover 62, the operating part body 712 may move between the first position and the second position.

The first position is a position when the operating part body 712 has moved to the top, and the second position is a position when the operating part body 712 has moved to the bottom.

In a state where no external force is applied to the operating part 710, the operating part body 712 may be located at the first position. The operating part body 712 may cover the slot 63 in a state where the operating part body 712 is located at the first position.

In one example, in a state where the operating part body 712 is located at the first position, the operating part body 712 may cover the entirety of the slot 63 inside the operating part cover 62. Accordingly, in a state where the operating part body 712 is located at the first position, the operating part body 712 may be exposed to the outside of the slot 63 and a space inside the operating part cover 62 may be prevented from being exposed.

The slot 63 may also extend in a direction parallel to the extending direction of the axis A1 of the cyclone flow of the first cyclone part 110.

In this embodiment, since the extending direction of the axis A1 of the cyclone flow is the up-down direction, for example, in the drawing, the "up-down direction" described below may be understood as the extending direction of the axis A1 of the cyclone flow.

Since the movable part 750 is located in the main body 2, the operating part 710 is located outside the main body 2, one portion of the transfer parts 720 and 730 may be located outside the main body 2 and the other portion thereof may be located inside the main body 2 to connect the movable part 750 and the operating part 710.

Portions of the transfer parts 720 and 730 may penetrate the main body 2. Portions of the transfer parts 720 and 730 located outside the main body 2 may be covered by the handle part 3.

The transfer parts 720 and 730 may include a first transfer part 720. The first transfer part 720 may be coupled to the operating part 710. For example, the first transfer part 720 may include a coupling projection 722. The coupling projection 722 may be coupled to a projection coupling portion (not shown) formed at the operating part body 712.

The coupling projection 722 may be formed to have a vertical length larger than a horizontal width thereof. The coupling projection 722 may limit relative rotation of the operating part 710 with respect to the first transfer part 720 in a horizontal direction.

The transfer parts 720 and 730 may further include a second transfer part 730 coupled with the movable part 750. A portion of the second transfer part 730 may be located inside the main body 2 and the other portion thereof may be located outside the main body 2.

The second transfer part 730 may be directly connected to the first transfer part 720 or may be connected by an additional transfer part.

For example, FIG. 3 illustrates a case where the second transfer part 730 is directly connected to the first transfer part 720. The first transfer part 720 may include a coupling portion 724 to which the second transfer part 730 may be coupled.

The second transfer part 730 may extend in a direction parallel to the axis A1 of the cyclone flow.

In the case of this embodiment, although not limited, the center of the movable part 750 may be located on the axis A1 of the cyclone flow or a vertical line passing through the center of the movable part 750 may be parallel to the axis A1 of the cyclone flow.

In this embodiment, the operating part 710 is disposed at a position eccentric from the center of the movable part 750. Therefore, eccentricity of the movable part 750 should be prevented in the process in which the movable part 750 moves up and down by the operation of the operating part 710.

If the movable part 750 moves up and down in an eccentric state, the movable part 750 may not form a horizontal state and may not move smoothly and the movable part 750 may not move accurately to the standby position.

When the transfer part for transferring an operation force of the operating part 710 to the movable part 750 includes one transfer part, a possibility that the movable part 750 is eccentric in the process of operating the operating part 710 is high.

For example, when the operating part 710 is directly connected to the movable part 750 or connected by a single transfer part, a path through which the operation force of the operating part 710 is transferred to the movable part 750 is short.

If the operating part 710 is operated in an eccentric state with respect to a vertical line, the effect of eccentricity of the operating part 710 may directly act on the movable part 750 so there is a high possibility that the movable part 750 is moved in the eccentric state.

However, as in the present disclosure, when the transfer part includes a plurality of transfer parts and transfers the operation force of the operating part to the movable part 750, even if the operating part 710 is eccentric with respect to the vertical line in the process of operating the operating part 710, the plurality of transfer parts may reduce the influence of the eccentric to minimize the amount of eccentricity of the movable part 750.

The main body 2 may further include a protruding body 180 for guiding the second transfer part 730. The protruding body 180 is, for example, present in a form protruding from the outside of the first housing 10.

The protruding body 180 may extend in a direction parallel to the extending direction of the axis A1 of the cyclone flow of the first cyclone part 110.

The protruding body 180 communicates with an internal space of the first housing 10, and the second transfer part 730 may move in the protruding body 180.

The cleaner 1 may further include a support mechanism 780 elastically supporting the compression mechanism 70.

The support mechanism 780 may include an elastic member 781 providing an elastic force to the compression mechanism 70. The elastic member 781 may provide the elastic force to the operating part 710 or the transfer parts 720 and 730. Hereinafter, a case where the elastic member 781 supports the operating part 710 will be described.

The elastic member 781 may be disposed spaced apart from the second transfer part 730 in the horizontal direction. The elastic member 781 may be, for example, a coil spring and may be expanded and contracted in the up-down direction.

Here, at the first position of the operating part 710 (the position of the operating part 710 before the user presses the operating part 710), a length of the elastic member 781 may be longer than a length of the second transfer part 730.

When the length of the elastic member 781 is longer than the length of the second transfer part 730, the operating part 710 may be supported using the elastic member 781 having a low modulus of elasticity.

In this case, a required force may be reduced when pressing the operating part 710. In addition, when the operating part 710 is returned to its original position by the elastic member 781, noise that may occur as the upper end 714*c* of the first portion 714*a* in the pressing part 714 collides with a surface forming the slot 63 of the operating part cover 62 may be reduced.

The support mechanism 780 may further include a support bar 790 supporting the elastic member 781 so that a horizontal movement of the elastic member 781 is limited in the vertical movement process of the operating part 710.

The support bar 790 may be formed in a cylindrical shape, for example. A vertical length of the support bar 790 may be longer than a vertical length of the elastic member 781.

The elastic member 781 may be disposed to surround the support bar 790. That is, the support bar 790 may be located at an inner region of the coil-shaped elastic member 781. An outer diameter of the support bar 790 may be equal to or smaller than an inner diameter of the elastic member 781.

One end of the support bar 790 may be fixed to the main body 2 or a transfer part cover, which will be described later. The first transfer part 720 may be coupled to the other end of the support bar 790.

Figure 6:
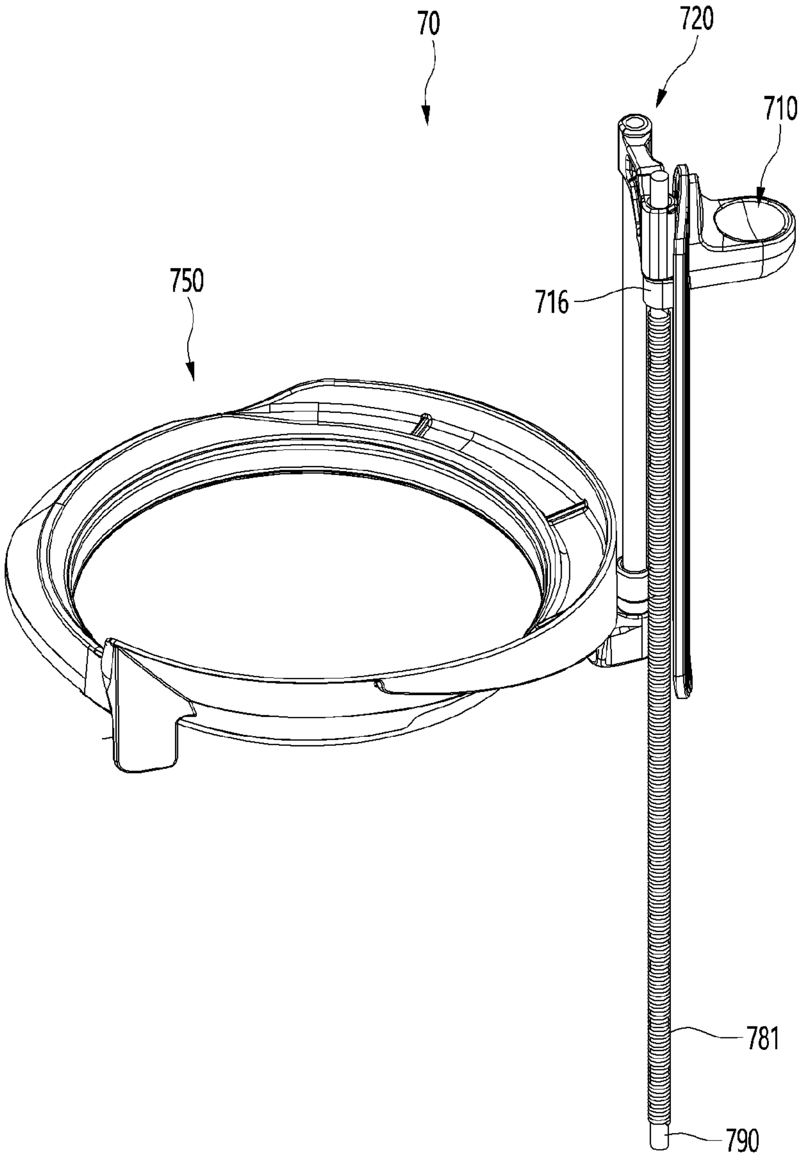
FIGS. 6 and 7 are perspective views of a compression mechanism according to an embodiment of the present disclosure.

Here, the support bar 790 may be coupled to the first transfer part 720 after passing through the coupling protrusion (See 716 in FIG. 6). A portion of the coupling protrusion (See 716 in FIG. 6) may be coupled to the first transfer part 720. The upper end of the elastic member 781 may contact the lower side of the coupling protrusion (see 716 in FIG. 6). The other end of the support bar 790 may be an upper end. The upper end of the support bar 790 may be coupled to penetrate the first transfer part 720.

The first transfer part 720 may move up and down along the support bar 790. Accordingly, the support bar 790 may guide a vertical movement of the first transfer part 720. Therefore, the support bar 790 may be referred to as a guide bar.

The cleaner 1 may further include a transfer part cover 64 covering the transfer parts 720 and 730.

The transfer part cover 64 may be coupled to the main body 2 in a state of covering the transfer parts 720 and 730. The operating part cover 62 may cover at least a portion of the transfer part cover 64. In this embodiment, the transfer part cover 64 may be omitted and the operating part cover 62 may serve as the transfer part cover 64. The transfer part cover 64 may also cover the support mechanism 780.

The first portion 641 of the transfer part cover 64 may cover the first transfer part 720, the support bar 790, and the elastic member 781 at the side of the protruding body 180. The second portion 644 of the transfer part cover 64 may be located above the protruding body 180 and may cover the second transfer part 730.

The transfer part cover 64 may include a slot 642 at which the coupling projection 722 of the first transfer part 720 is located. The slot 642 may extend in the up-down direction.

The transfer part cover 64 may have a bar coupling portion 645 to which the support bar 790 may be coupled.

Meanwhile, the main body 2 may further include a suction motor 220 for generating a suction force. The suction force generated by the suction motor 220 may act on the suction part 5. The suction motor 220 may be located in the second housing 12, for example.

The suction motor 220 may be located above the dust bin 112 and the battery 600 with respect to the extending direction of the axis A1 of the cyclone flow of the first cyclone part 110.

The main body 2 may further include an air guide 170 guiding air passing through the filter part 130 to the suction motor 220.

In one example, the air guide 170 may guide air discharged from the second cyclone part 140 to the suction motor 220.

The second cyclone part 140 may be coupled to a lower side of the air guide 170. The filter part 130 may surround the second cyclone part 140 in a state of being coupled to the second cyclone part 140.

Therefore, the filter part 130 may also be located below the air guide 170. The movable part 750 may be disposed at a position surrounding the air guide 170 in a standby position.

The movable part 750 may include a cleaning part 770 for cleaning the filter part 130.

In this embodiment, a position of the movable part 750 in a state where the operating part 710 is not operated (an initial position of the operating part 710) may be referred to as a standby position (or the first position). That is, the position of the movable part 750 when the operating part 710 is located at the first position may be referred to as the standby position. A position of the movable part 750 when the operating part 740 is located at the second position may be referred to as a dust compression position (or the second position).

At the standby position of the movable part 750, the entirety of the cleaning part 770 may be disposed not to overlap the filter part 130 in a direction in which air passes through the filter part 130. For example, at the standby position of the movable part 750, the entirety of the cleaning part 770 may be located higher than the filter part 130. Accordingly, at the standby position of the movable part 750, the cleaning part 770 may be prevented from acting as a flow resistance in the process in which air passes through the filter part 130.

A dust guide 160 may be provided below the second cyclone part 140. A lower side of the second cyclone part 140 may be coupled to an upper side of the dust guide 160. In addition, a lower side of the filter part 130 may be seated on the dust guide 160.

The lower side of the dust guide 160 may be seated on the housing cover 114. The dust guide 160 is spaced apart from the inner circumferential surface of the first housing 10 and divides an internal space of the first housing into a first dust storage 120 storing dust separated at the first cyclone part 110 and a second dust storage 122 storing dust separated at the second cyclone part 140.

The inner circumferential surface of the first housing 10 and the outer circumferential surface of the dust guide 160 may define the first dust storage 120, and the inner circumferential surface of the dust guide 160 may define the second dust storage 122.

Hereinafter, the compression mechanism 70 will be described in more detail.

Figure 7:
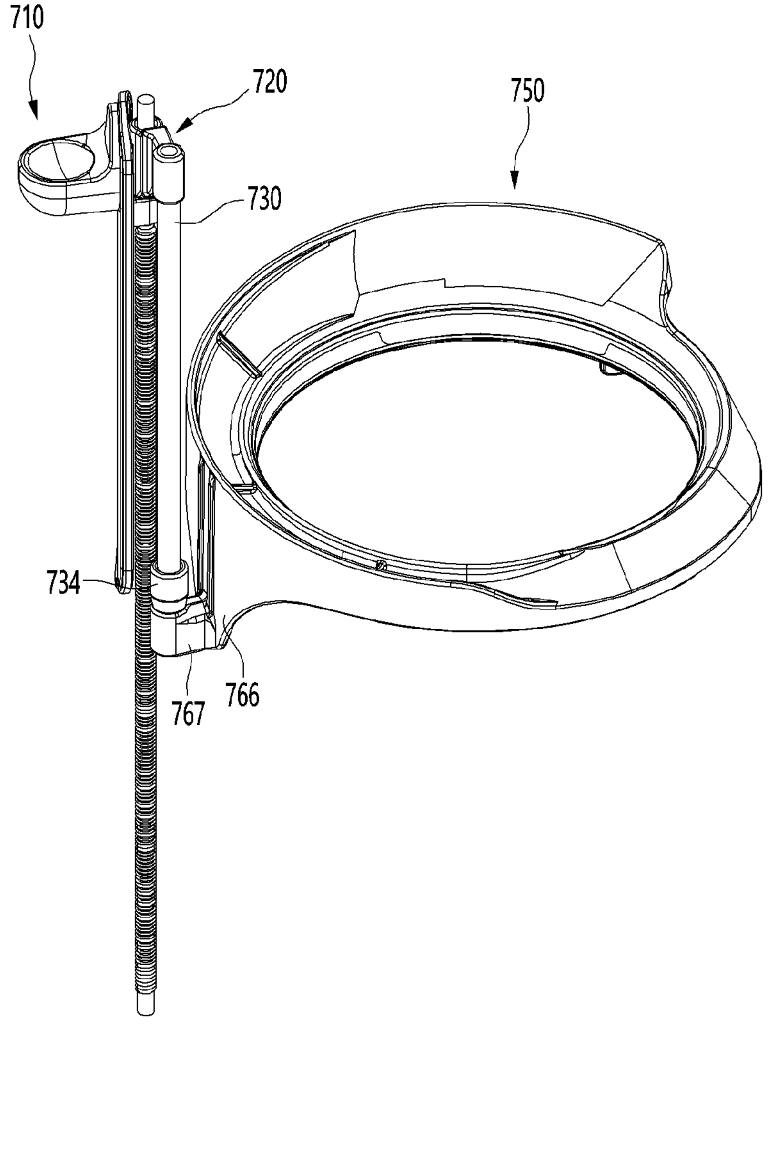
Figure 8:
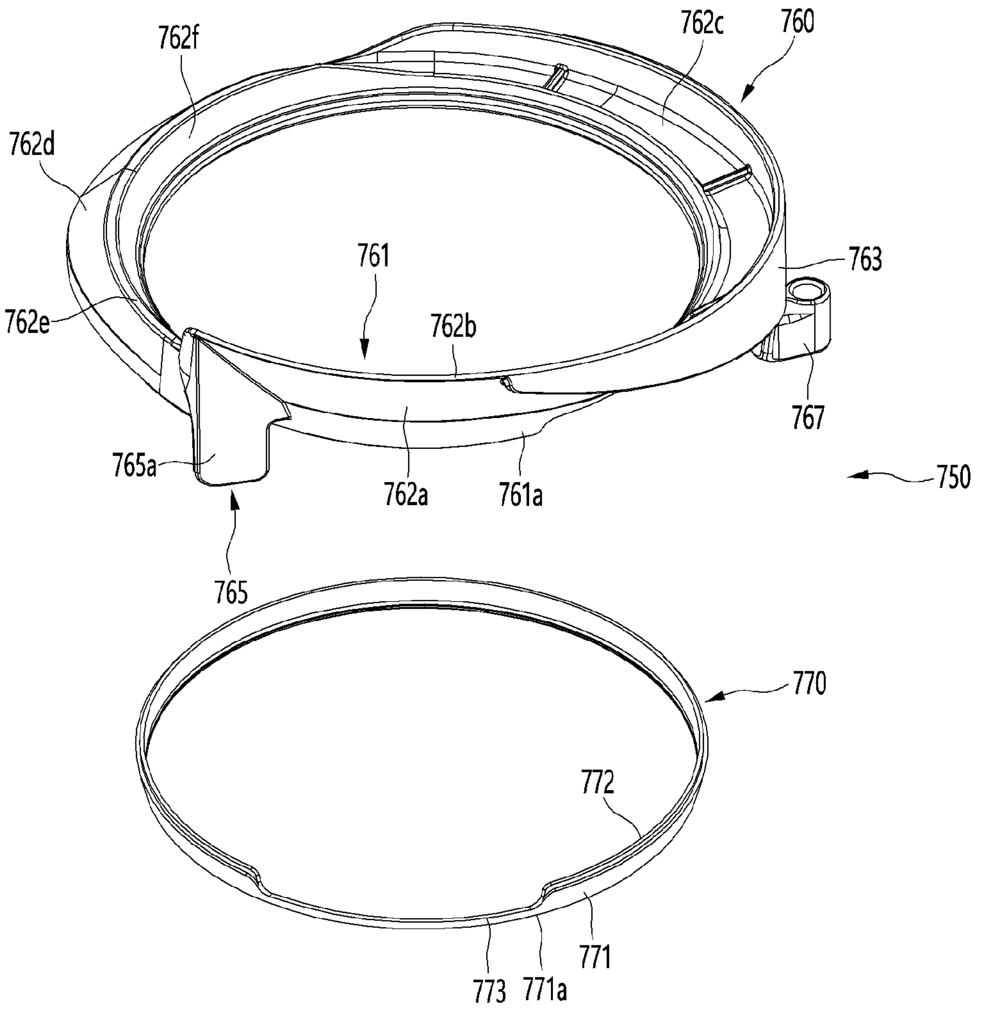
FIG. 8 is an exploded perspective view of a movable part according to an embodiment of the present disclosure.
Figure 9:
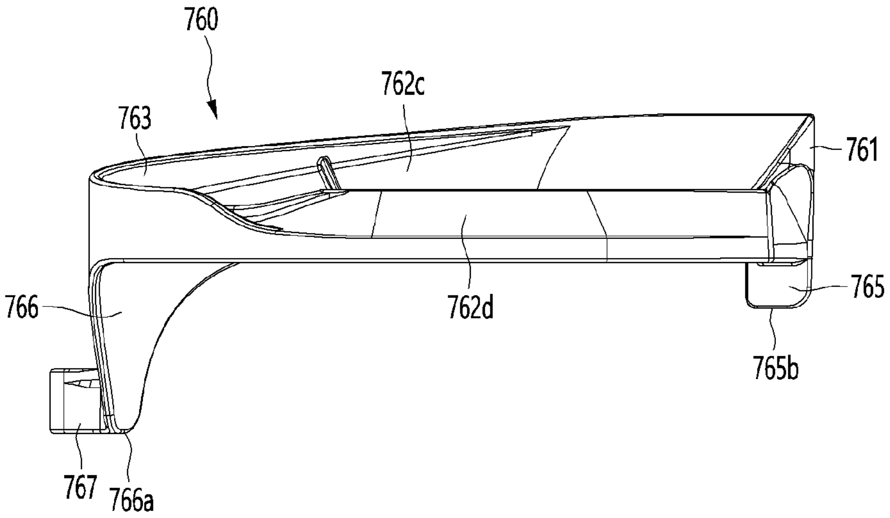
FIG. 9 is a side view of a frame according to an embodiment of the present disclosure.

FIGS. 6 and 7 are perspective views of a compression mechanism according to an embodiment of the present disclosure, and FIG. 8 is an exploded perspective view of a movable part according to an embodiment of the present disclosure. FIG. 9 is a side view of a frame according to an embodiment of the present disclosure.

Referring to FIGS. 6 to 9, the movable part 750 may include a frame 760.

The frame 760 may be disposed to surround the axis A1 of the cyclone flow. The frame 760 may be formed in a ring shape around the axis A1 of the cyclone flow.

A maximum diameter of the frame 760 may be smaller than a diameter of an inner circumferential surface of the first cyclone part 110. Therefore, the frame 760 may be moved up and down in a state of being spaced apart from the inner circumferential surface of the first cyclone part 110.

In the case of the present embodiment, even if the movable part 750 moves up and down in an eccentric state, frictional contact of the movable part 750 with the inner circumferential surface of the first housing 10 (for example, the first cyclone part 110 and/or dust bin 112) may be prevented.

In addition, when the frame 760 is spaced apart from the inner circumferential surface of the first cyclone part 110, air and dust suctioned into the first cyclone part 110 may flow downward through the inner circumferential surface of the first cyclone part 110 and the frame 760 in a state where the movable part 750 has moved downward during the cleaning process.

The frame 760 may support the cleaning part 770. The cleaning part 770 may be formed of an elastically deformable material. For example, the cleaning part 770 may be formed of a rubber material. The cleaning part 770 may be formed in a ring shape so that the cleaning part 770 may clean the entirety of the circumference of the cylindrical filter part 130. As another example, the cleaning part 770 may be formed of silicone or a fiber material.

When the cleaning part 770 is formed of an elastically deformable material, damage to the filter part 130 when the cleaning part 770 is in frictional contact with the filter part 130.

The movable part 750 may move from the standby position to a dust compression position.

The cleaning part 770 may wait at a position away from the filter part 130 at the standby position, and during the cleaning process, the cleaning part may wipe the outer surface of the filter part 130, while moving to the dust compression position.

The cleaning part 770 may include a cleaning end 771*a*. The cleaning end 771*a* may be in contact with the outer surface of the filter part 130 during the cleaning process.

In the present embodiment, since the cleaning part 770 is formed of an elastically deformable material, when the cleaning part is lowered and the cleaning end 771*a* comes into contact with the filter part 130, the cleaning part 770 may be elastically deformed outward in a radial direction of the filter part 130, and in the elastically deformed state, the cleaning end 771*a* may come into contact with the filter part 130.

Therefore, when the cleaning end 770 is lowered in a state where the cleaning end 771*a* is in contact with the circumference of the filter part 130, the cleaning end 771*a* removes dust adhered to the outer surface of the filter part 130.

In the case of the present embodiment, since the cleaning end 771*a* is moved in contact with the filter part 130, the cleaning part 770 may reduce eccentricity of the movable part 750 in the vertically moving process.

In one example, in a state where the movable part 750 is inclined with respect to a horizontal direction, a contact force between a portion of the cleaning end 771*a* and the filter part 130 increases, so that the cleaning end 771*a* is deformed and inclination of the movable part 750 may be reduced.

The cleaning part 770 may include a first body 771 and a second body 772 extending upward from the first body 771.

A thickness of the second body 772 may be smaller than a thickness of the first body 771. The second body 772 may be coupled to a lower side of the frame 760. For example, the cleaning part 770 may be coupled to the frame 760 by insert injection molding.

The cleaning part 770 may further include a depressed portion 773 recessed downward from the upper end. A lower extending portion 761*a* extending from the frame 760 may be located in the depressed portion 773. The lower extending portion 761*a* located in the depressed portion 773 may be aligned with the suction passage.

The frame 760 may include a frame body 761 supporting the cleaning part 770. At the standby position, a portion of the frame body 761 may be in contact with the outer surface of the air guide 170. A portion of the frame body 761 may surround an outer surface of the air guide 170 in a circumferential direction.

In one example, the frame body 761 may include a first body 762*a* surrounding the outer surface of the air guide 170. The first body 762*a* may also be referred to as a guide cover part. At the standby position, an upper end 762*b* of the first body 762*a* may be located at the highest in the frame body 761.

The frame body 761 may further include a second body 762*c* having a height lowered in a direction away from the first body 762*a*.

The first body 762*a* may be inclined to have a first inclination angle with respect to a horizontal surface. The first body 762*a* may be inclined in a direction toward the axis A1 of the cyclone flow from the upper side to the lower side.

An inclination angle of the second body 762*c* with respect to the horizontal surface may be reduced in a direction away from the first body 762*a*. Therefore, the second body 762*c* may be spaced apart from the air guide 170.

The frame body 761 may further include a third body 762*d* extending from the second body 762*c*. An inclination angle of the third body 762*d* with respect to the horizontal surface may increase in a direction away from the second body 762*d*.

The third body 762*d* may be connected to the first body 762*a*.

The upper end 762*b* of the first body 762*a* is located higher than the upper end 762*e* of the third body 762*d*. Therefore, the upper end 762*b* of the first body 762*a* is stepped from the upper end 762*e* of the third body 762*d*.

The frame body 761 may include a fourth body 762*f* inclined toward the center of the frame 760 from the upper end 762*e* of the third body 762*d*.

With respect to a vertical line passing through the upper end, the third body 762*d* is inclined downward to the outside and the fourth body 762*f* is inclined downward to the inside.

An inclination direction of the fourth body 762*f* may be the same as an inclination direction of the first body 762*b*. At least a portion of the fourth body 762*f* may be in contact with the outer circumferential surface of the air guide 170.

The outer circumferential surface of the second body 726*c* may be provided with an outer wall 763 extending upward. A height of an upper end of at least a portion of the outer wall 763 may be lowered toward the third body 762*d*.

The lower extending portion 761*a* may extend downward from the lower side of the first body 762*a*. Here, the inclination angle of the lower extending portion 761*a* is greater than the inclination angle of the first body 762*a* with respect to the horizontal surface.

Therefore, the air that meets the first body 762*a* flows to be inclined downward and may flow smoothly downward by the lower extending portion 761*a*.

The frame 760 may further include a lower extending wall 766 extending downward from the frame body 761. The lower extending wall 766 may be rounded in the circumferential direction of the frame 760.

The lower extending wall 766 serves to press dust stored in the dust bin 112 downward while the movable part 750 is lowered. The lower extending wall 766 may be located, for example, at a portion where the outer wall 763 is formed at the frame body 761.

The frame 760 may further include a coupling portion 767 extending outward from the lower extending wall 766.

The coupling portion 767 may protrude in the horizontal direction from the lower extending wall 766. For example, the coupling portion 767 may extend in a horizontal direction from a lower end 766*a* side of the lower extending wall 766. The second transfer part 730 may be connected to the coupling portion 767.

A buffer part 734 may be coupled to the second transfer part 730. The second transfer part 730 may be coupled to penetrate the buffer part 734. The shock buffer part 734 may be seated on an upper surface of the coupling portion 767 in a state where the shock absorber 734 is coupled to the second transfer part 730.

The second transfer part 730 may penetrate an upper wall of the protruding body 180.

The buffer part 734 absorbs a shock that occurs when the movable part 750 comes into contact with the upper side wall of the protruding body 180 in the process of moving from the dust compression position to the standby position, and accordingly, the occurrence of noise may be reduced.

The frame 760 may further include a frame guide 765 extending downward from the frame body 761.

For example, the frame guide 765 may extend downward from an outer circumferential surface of the first body 762*a*. In addition, the frame guide 765 may extend in a horizontal direction from an outer circumferential surface of the first body 762*a*.

The frame guide 765 may include a planar guide surface 765*a*. The guide surface 765*a* may guide a spiral flow of air in the process of air flowing through the suction part 5. For example, the frame guide 765 may guide a horizontal flow of air. The lower end 765*b* of the frame guide 765 may be located higher than the lower end 766*a* of the lower extending wall 766.

Figure 10:
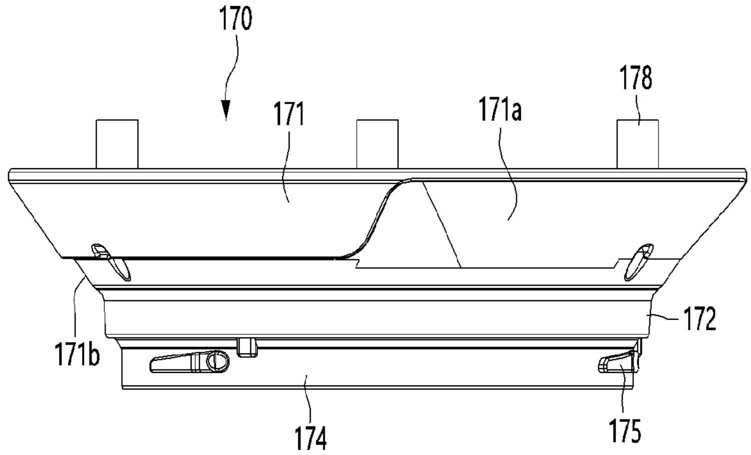
FIG. 10 is a side view of an air guide according to an embodiment of the present disclosure.
Figure 11:
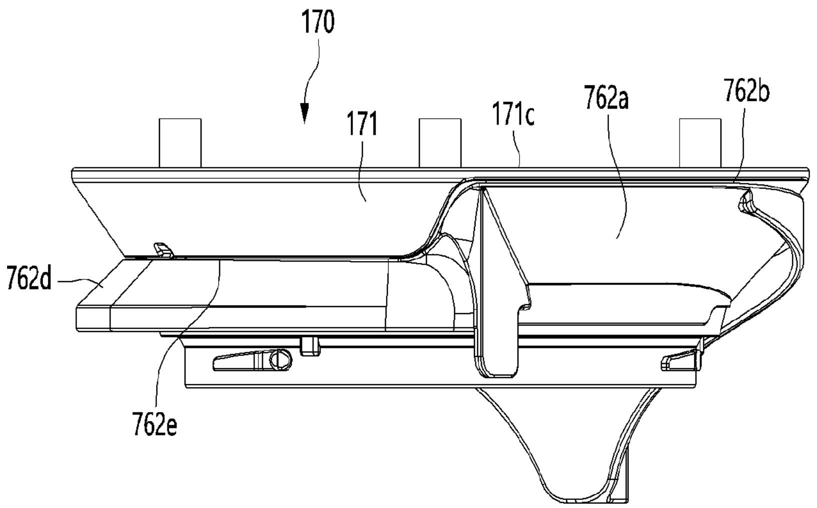
FIG. 11 is a view showing an arrangement relationship of a movable part and an air guide at a standby position of the movable part.

FIG. 10 is a side view of an air guide according to an embodiment of the present disclosure. FIG. 11 is a view showing an arrangement relationship of the movable part and the air guide at the standby position of the movable part.

Referring to FIGS. 10 and 11, the air guide 170 may include a guide wall 171. An inner circumferential surface of the guide wall 171 may form a flow path guiding air discharged from the second cyclone part 140.

The guide wall 171 may be arranged to surround the axis A1 of the cyclone flow. The guide wall 171 may be formed in a ring shape, for example, and at least a portion of the guide wall 171 may be reduced in diameter from an upper side to a lower side.

The guide wall 171 may include a first seating portion 171*a* for a portion of the frame body 761 to be seated thereon. The first seating portion 171*a* may be formed as the outer circumferential surface of the guide wall 171 is recessed toward the center. The first body 762*a* of the frame body 761 may be seated on the first seating portion 171*a*.

The guide wall 171 may further include a second seating portion 171*b*. The second seating portion 171*b* may be formed as the outer circumferential surface of the guide wall 171 is recessed toward the center. A fourth body 762*f* may be seated on the second seating portion 171*b* at the frame body 761.

In a state where the frame body 761 is seated on the guide wall 171, the upper end 762*b* of the first body 762*a* is located lower than the upper end 171*c* of the guide wall 171.

The air guide 170 may further include an extending wall 172 disposed to face the contact end 771*a* of the cleaning part 770 at the standby position. The extending wall 172 may extend downward from the lower end of the guide wall 171.

The extending wall 172 may be located below the first seating portion 171*a* and the second seating portion 171*b*.

The air guide 170 may further include a coupling wall 174 extending downward from the extending wall 172. The second cyclone part 140 may be coupled to the coupling wall 174.

A coupling projection 175 may be formed on an outer circumferential surface of the coupling wall 174. The coupling projection 175 may be accommodated in a projection recess (not shown) of the second cyclone part 140.

The air guide 170 may further include a fastening boss 178 extending upward from an inner circumferential surface of the guide wall 171. The air guide 170 may be fastened with one component in the main body 2 by the fastening boss 178.

Figure 13:
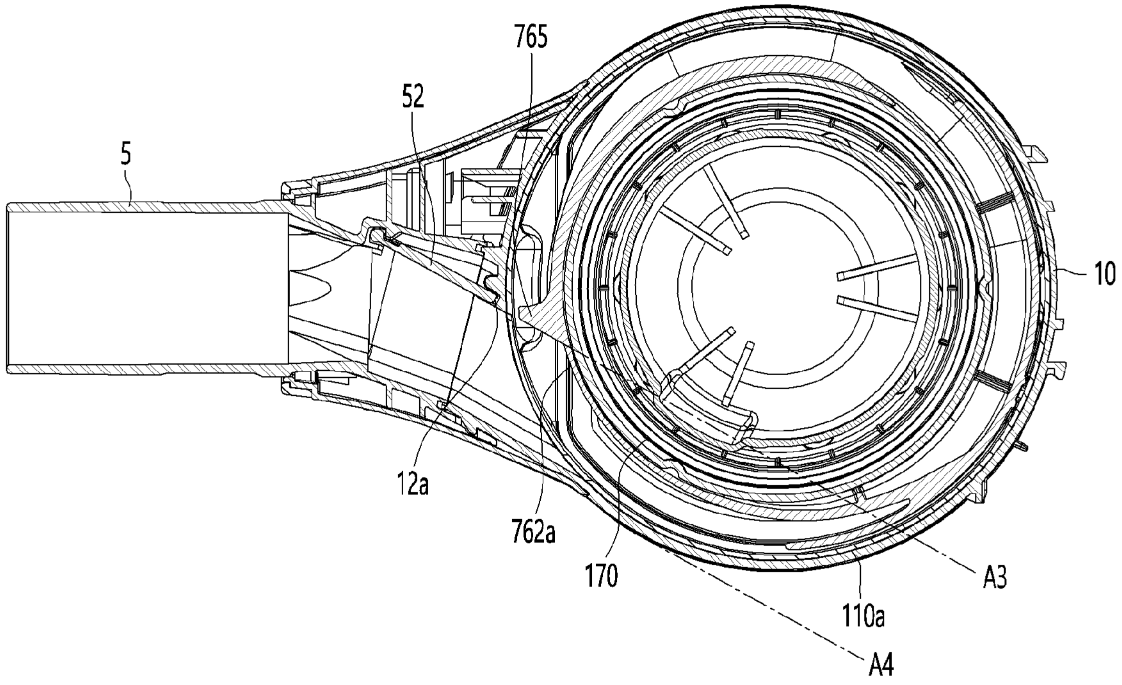
FIG. 13 is a cross-sectional view taken along line 13-13 of FIG. 5.
Figure 14:
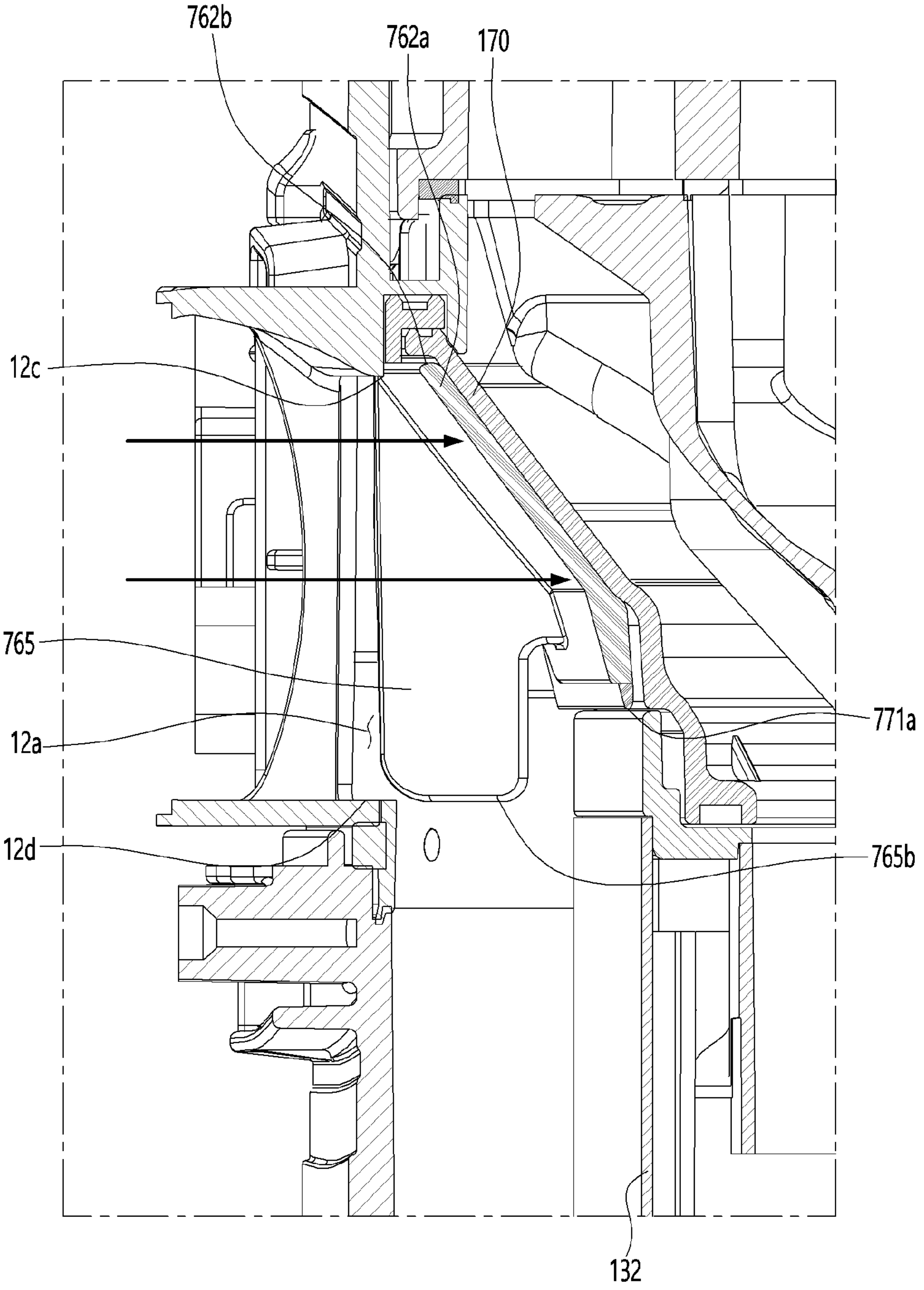
FIG. 14 is a cross-sectional view taken along line 14-14 of FIG. 12.

FIG. 12 is a view showing a suction opening viewed from the outside of the main body. FIG. 13 is a cross-sectional view taken along line 13-13 of FIG. 5. FIG. 14 is a cross-sectional view taken along line 14-14 of FIG. 12.

Referring to FIGS. 12 to 14, the main body 2 may further include a suction guide 12*b* guiding air toward the suction opening 12*a*. The suction guide 12*b* may be coupled to the suction part 5.

The suction part 5 may have a flow guide 52. The flow guide 52 guides air and dust to flow toward the inner circumferential surface 110*a* of the first cyclone part 110.

The frame guide 765 may extend in the same direction or in a direction parallel to the extending direction of the flow guide 52.

As an example, an extending line A4 extending in a tangential direction of the first housing 10 (or the first cyclone part 110) and an extending line A3 of the frame guide 765 (or the guide surface 765*a*) may be parallel to each other.

When the suction opening 12*a* is viewed from the outside of the main body 2, a portion of the movable part 750 may be aligned with the suction opening 12*a* at the standby position of the movable part 750.

For example, a portion of the frame 760 and a portion of the cleaning part 770 may be aligned with the suction opening 12*a*.

At least a portion of the first body 762*a* in the frame 760 may be aligned with the suction opening 12*a*. The first body 762*a* may face the suction opening 12*a* at a position spaced apart from the suction opening 12*a*.

The upper end 762*b* of the first body 762*a* may be located to be the same as or higher than the upper end 12*c* of the suction opening 12*a* so that a portion of the guide wall 171 located higher than the upper end 762*b* of the first body 762*a* may not be aligned with the suction opening 12*a*.

A boundary portion between the upper end 762*b* of the first body 762*a* and the guide wall 171 may be located higher than the upper end 12*c* of the suction opening 12*a*.

At the standby position of the movable part 750, the movable part 750 is limited from moving upward and is movable downward by an external force.

If air or dust flows toward the upper end 762*b* of the first body 762*a* in a state here the upper end 762*b* of the first body 762*a* is located lower than the upper end 171*c* of the guide wall 171, a flow force of air may act as an eternal force for the first body 762*a* to move downward to cause a gap between the first body 762*a* and the guide wall 171 to be open.

When the gap between the guide wall 171 and the first body 762*a* is open, air or dust flows into the gap, causing a problem that the movable part 750 may not smoothly move downward if the movable part 750 is not located in place.

In addition, when the movable part 750 is not located in place, the movable part 750 may act as a flow resistance of air and dust suctioned through the suction opening 12*a*, thereby degrading dust separation performance.

However, according to the present disclosure, since the height of the first body 762*a* is set such that the portion of the guide wall 171 located higher than the upper end 762*b* of the first body 762*a* is not exposed through the suction opening 12*a*, the movable part 750 may wait at the regular position.

The suction opening 12*a* may be aligned with at least a portion of the frame guide 765. The frame guide 765 may guide air and dust suctioned through the suction opening 12*a*.

The air guided by the frame guide 765 may flow along an outer circumferential surface of the first body 762*a*.

At least a portion of the first body 762*a* may be inclined in a direction away from the suction opening 12*a* from the upper side to the lower side. That is, the first body 762*a* is inclined toward the axis A1 of the cyclone flow from the upper side to the lower side.

Therefore, air or dust guided by the frame guide 765 and brought into contact with the first body 762*a* or air or dust brought into contact with the first body 762*a* immediately after passing through the suction opening 12*a* may be smoothly moved downward by the inclination of the first body 762*a*.

When the air or dust in contact with the first body 762*a* is smoothly moved downward, dust or air may be prevented from flowing to the boundary between the first body 762*a* and the air guide 170.

In addition, the air flowing along the first body 762*a* may smoothly flow downward by the lower extending portion 761*a*.

Meanwhile, the upper end of the mesh portion 132 may be located lower than the lower end 12*d* of the suction opening 12*a* to prevent air suctioned through the suction opening 12*a* from directly passing through the mesh portion 132.

At the standby position, the contact end 771*a* of the cleaning part 770 may be located higher than the upper end of the mesh portion 132. Therefore, it is possible to prevent the contact end 771*a* of the cleaning part 770 from blocking the mesh portion 132.

A height H2 of the frame 760 aligned with the suction opening 12*a* may be lower than a height H1 of the suction opening 12*a*. Therefore, a portion of the cleaning part 770 may also be aligned with the suction opening 12*a*. For example, the contact end 771*a* of the cleaning part 770 may be located higher than the lower end 12*d* of the suction opening 12*a*.

If the contact end 771*a* of the cleaning part 770 is located lower than the lower end 12*d* of the suction opening 12*a*, the mesh portion 132 spaced apart from the contact end 771*a* is away from the suction opening 12*a*, disadvantageously increasing a height of the main body 2.

Meanwhile, when the contact end 771*a* of the cleaning part 770 is located higher than the lower end 12*d* of the suction opening 12*a* as in the present disclosure, the upper end of the mesh portion 132 may be located lower than the lower end 12*d* of the suction opening 12*a* and located closer to the lower end 12*d*, thus preventing an increase in the height of the main body 2.

As a distance between the contact end 771*a* and the mesh portion 132 increases, a distance by which the contact end 771*a* should move to come into contact with the mesh portion 132 increases.

A height H2 of the frame 760 aligned with the suction opening 12*a* may be greater than ½ of a height H1 of the suction opening 12*a* to reduce the distance between the contact end 771*a* and the mesh portion 132.

At the standby position of the movable part 750, the contact end 771*a* of the cleaning part 770 may be located closer to the lower end 12*d* than the upper end 12*c* of the suction opening 12*a*.

For example, the lower extending portion 761*a* of the frame body 760 may be aligned with the suction opening 12*a*.

Therefore, while the cleaning part 770 connected to the frame body 761 is prevented from coming into contact with the filter part 730, the frame body 760 may sufficiently guide introduced air and dust.

Since the height of the portion of the cleaning part 770 located below the lower extending portion 761*a* is smaller than the height of the other portion of the cleaning part 770, relative deformation for the frame body 761 due to the contact of air and dust may be minimized. Therefore, the occurrence of a gap between the frame body 761 and the cleaning part 770 may be prevented.

The lower end 765*b* of the frame guide 765 may be located lower than the contact end 771*a* of the cleaning part 770. The lower end 765*b* of the frame guide 765 may be located lower than the lower extending portion 761*a*. For example, the lower end 765*b* of the frame guide 765 may be located to be the same as or lower than the lower end 12*d* of the suction opening 12*a*. Therefore, the frame guide 762 may guide the flow of air flowing overall with respect to the height of the suction opening 12*a*.

It will be apparent to those skilled in the art that various modifications and variations may be made in the present disclosure without departing from the spirit or scope of the disclosures. Thus, it is intended that the present disclosure covers the modifications and variations of this disclosure provided they come within the scope of the appended claims and their equivalents.

What is claimed is:

1. A cleaner comprising:

a housing comprising a suction opening, a cyclone part configured to separate air and dust received through the suction opening, and a dust bin configured to store dust separated from air in the cyclone part; and a frame disposed to surround an axis of a cyclone flow of the cyclone part in the housing, the frame configured to be movable between a standby position and a compression position in the housing, wherein the frame comprises a first body disposed to face the suction opening at the standby position, the first body disposed to be inclined with respect to the axis of the cyclone flow, wherein a portion of the first body is located higher than a center of the suction opening at the standby position, and another portion of the first body is located lower than the center of the suction opening at the standby position, and wherein an upper end of the first body is located at the same height or above an upper end of the suction opening, wherein the standby position is an initial static position of the frame.

2. The cleaner of claim 1, further comprising:

a guide wall disposed to surround the axis of the cyclone flow of the cyclone part in the housing, the guide wall configured to guide a flow of air, and wherein the frame is configured to surround the guide wall at the standby position.

3. The cleaner of claim 2, wherein the first body is in contact with the guide wall at the standby position, and wherein a boundary portion between the upper end of the first body and the guide wall is located above the upper end of the suction opening.

4. The cleaner of claim 1, wherein the first body is spaced apart from the suction opening, and at least a portion of the first body is inclined in a direction that is away from the suction opening.

5. The cleaner of claim 1, further comprising:

a filter part configured to purify air separated from dust at the cyclone part and disposed to surround the axis of the cyclone flow; and a cleaning part connected to a lower portion of the frame, wherein at least a portion of the cleaning part is in alignment with the suction opening at the standby position.

6. The cleaner of claim 5, further comprising:

a lower extending portion extending in a downward direction from the first body, wherein the cleaning part comprises a depressed portion to accommodate the lower extending portion, and wherein the lower extending portion is in alignment with the suction opening at the standby position.

7. The cleaner of claim 6, wherein the lower extending portion is inclined with respect to the first body.

8. The cleaner of claim 6, wherein a height of a portion of the cleaning part located below the lower extending portion is below a height of other portions of the cleaning part.

9. The cleaner of claim 5, wherein the filter part comprises a mesh material portion allowing air to pass there through, and wherein an upper end of the mesh material portion is located below a lower end of the suction opening.

10. The cleaner of claim 9, wherein the cleaning part comprises a contact end configured to contact the mesh material portion during the process of moving from the standby position to the compression position, and wherein the contact end is located above the upper end of the mesh material portion at the standby position.

11. The cleaner of claim 10, wherein the contact end is located closer to the lower end of the suction opening than to the upper end of the suction opening at the standby position.

12. The cleaner of claim 1, wherein the frame further comprises a frame guide extending in a downward direction from an outer circumferential surface of the first body, the frame guide being aligned with the suction opening.

13. The cleaner of claim 12, wherein the frame guide comprises a guide surface, and wherein an extending line of the guide surface is parallel to an extending line extending in a tangential direction of the cyclone part.

14. The cleaner of claim 12, further comprising:

a filter part configured to purify air separated from dust at the cyclone part and disposed to surround the axis of the cyclone flow; and a cleaning part connected to a lower portion of the frame, wherein the cleaning part comprises a contact end configured to contact the filter part during the process of moving from the standby position to the compression position, and wherein a lower end of the frame guide is located below the contact end at the standby position.

15. The cleaner of claim 14, wherein the contact end is located above a lower end of the suction opening at the standby position, and wherein the lower end of the frame guide is located at the same height as a height of a lower end of the suction opening or below the lower end of the suction opening.

16. A cleaner comprising:

a housing comprising a suction opening, a cyclone part configured to separate air and dust received through the suction opening, and a dust bin configured to store dust separated from the air at the cyclone part; and a frame disposed to surround an axis of a cyclone flow of the cyclone part in the housing, the frame configured to be movable between a standby position and a compression position in the housing, the frame disposed such that at least a portion thereof faces the suction opening at the standby position, wherein the frame comprises:

a first body configured to guide air received through the suction opening in a downward direction at the standby position;

a lower extending portion extending in a downward direction from a lower side of the first body; and a frame guide extending horizontally from the first body, the frame guide configured to guide a horizontal flow of air received through the suction opening, wherein an upper portion of the frame guide is located higher than a center of the suction opening at the standby position, and a lower portion of the frame guide is located lower than the center of the suction opening at the standby position, wherein the standby position is an initial static position of the frame.

17. The cleaner of claim 16, wherein the frame guide extends in a downward direction from the first body, and wherein a lower end of the frame guide is located below a lower end of the lower extending portion at the standby position.

18. The cleaner of claim 16, wherein the first body is inclined in a direction that is away from the suction opening from an upper side to a lower side.

19. The cleaner of claim 16, wherein an upper end of the first body is located at a height that is the same as or above an upper end of the suction opening at the standby position.

20. A cleaner comprising:

a housing including a suction opening, a cyclone part configured to separate air and dust received through the suction opening, and a dust bin configured to store dust separated from the air at the cyclone part; and a frame disposed to surround an axis of a cyclone flow of the cyclone part in the housing, the frame configured to be movable between a standby position and a compression position in the housing, the frame disposed such that at least a portion thereof faces the suction opening at the standby position, wherein the frame comprises a first body in which at least a portion thereof is inclined in a direction that is away from the suction opening from an upper side to a lower side to guide air received through the suction opening in a downward direction at the standby position, wherein a portion of the first body is located higher than a center of the suction opening at the standby position, and another portion of the first body is located lower than the center of the suction opening at the standby position, and wherein an upper end of the first body is located at a height that is the same as or above an upper end of the suction opening at the standby position, wherein the standby position is an initial static position of the frame.

* * * * *